United States Patent [19]

Sekmakas et al.

[11] 4,425,451

[45] Jan. 10, 1984

[54] EPOXY-PHOSPHATE AQUEOUS DISPERSIONS

[75] Inventors: Kazys Sekmakas, Palatine; Raj Shah, Schaumburg, both of Ill.

[73] Assignee: DeSoto, Inc., Des Plaines, Ill.

[21] Appl. No.: 428,275

[22] Filed: Sep. 29, 1982

[51] Int. Cl.$^3$ .................... C08G 59/14; C08L 63/00
[52] U.S. Cl. .................... 523/414; 523/402; 523/424; 528/89; 528/109; 528/398
[58] Field of Search .................... 523/402, 414, 424; 528/109, 89, 398

[56] References Cited

U.S. PATENT DOCUMENTS

| | | | |
|---|---|---|---|
| 2,732,367 | 1/1956 | Shokal | 528/108 |
| 4,145,323 | 3/1979 | Sekmakas et al. | 523/402 |
| 4,256,844 | 3/1981 | Martin et al. | 528/108 |
| 4,316,922 | 2/1982 | Perine et al. | 523/402 |

*Primary Examiner*—Ronald W. Griffin
*Attorney, Agent, or Firm*—Dressler, Goldsmith, Shore, Sutker & Milnamow, Ltd.

[57] ABSTRACT

Water dispersible epoxy-phosphate ester polymer salts are disclosed which exhibit improved stability in coating compositions contining aminoplast or phenoplast resin. These salts are provided by reacting a resinous polyepoxide having at least about 1.4 oxirane groups per molecule with less than 0.9 mol of orthophosphoric acid for each oxirane equivalent in the polyepoxide to form a monoester reaction product containing residual epoxy functionality. The monoester reaction product so-provided is then reacted with at least 1 mol of a volatile amine per equivalent of oxirane functionality in said monoester to provide a water dispersible product lacking oxirane functionality. Ether alcohols, and especially 2-butoxy ethanol, are relied upon to provide dispersions having low viscosity.

14 Claims, No Drawings

EPOXY-PHOSPHATE AQUEOUS DISPERSIONS

DESCRIPTION

1. Technical Field

This invention relates to epoxy-phosphate ester polymer salts and their production, and to aqueous dispersions and aqueous coating compositions containing the same.

2. Background Art

Reaction products of orthophosphoric acid and epoxy resins are known catalysts to promote the cure of aminoplast resins and phenoplast resins with hydroxycontaining resins, including epoxy resins. These reaction products can be dispersed in water with the aid of ammonia or other volatile amine to produce known coating compositions of the type under consideration.

It is further known that one can employ excess epoxy resin in the reaction with phosphoric acid, but this has created problems when aminoplast or phenoplast resins are added because the systems are not adequately stable and their characteristics change with time. It is believed that this instability results from the fact that aminoplast resins and phenoplast resins provide methylol groups which react with unconsumed oxirane functionality in the epoxy resin.

A primary objective of this invention is to eliminate this instability so as to provide aqueous coating compositions having enhanced utility in commerce.

DISCLOSURE OF INVENTION

In accordance with this invention, a water dispersible epoxy-phosphate ester polymer, oxirane-functionfree, salt reaction product is provided of (1) a monoester reaction product containing residual epoxy functionality, of (a) a resinous polyepoxide having at least about 1.4 oxirane groups (preferably from 0.1 to 0.7 mol) per molecule and (b) less than 0.9 mol of orthophosphoric acid for each oxirane equivalent in the polyepoxide, with (2) at least 1 mol of a volatile amine (preferably a tertiary amine) per equivalent of oxirane functionality in the monoester. It is stressed that it is essential to employ herein at least 1 mol, and preferably at least 2 mols, of amine per mol of available oxirane functionality in the monoester. When this is done, the amine destroys the unreacted oxirane functionality to produce a polymeric product which includes salt groups between the amine and the unreacted acidity in the phosphoric acid monoester and which is stably dispersible in water with the aid of water-miscible organic solvent. The invention includes the new water dispersible products and also the method of producing the same. The invention also includes the aqueous dispersions which are formed as well as such dispersions containing curing agents.

As a feature of the invention, the monoester salt is provided as an organic solvent solution in water miscible organic solvent medium comprising at least about 10% of an ether alcohol, preferably 2-butoxy ethanol. The ether alcohol helps the inversion of the solvent solution into a water dispersion, and the selection of 2-butoxy ethanol, especially when it constitutes more than 75% of the solvent medium, unexpectedly provides a fine particle size dispersion of reduced viscosity, and it also enhances the compatibility of the dispersion with other resins. Other useful ether alcohols are 2-ethoxy ethanol and 2-ethoxy propanol.

The products of this invention are particularly intended for use in aqueous coating compositions containing an aminoplast or phenoplast resin in an amount of 5% to 50% of total resin solids to react with the hydroxy groups in the epoxy phosphate polymer after the coatings are applied. This reaction is facilitated by baking the coatings. The epoxy-phosphate polymer is not only a reactant, but it also serves as catalyst.

It is particularly preferred to include in the aqueous coating composition, from 5% to 40% of total resin solids of a water dispersible polyhydric alcohol having a molecular weight of at least about 300, such as a propylene oxide adduct of trimethylol propane of molecular weight 400, since this yields superior coatings.

The water dispersible epoxy-phosphate ester polymers of this invention can constitute from 1% to 90% of the coating composition, but preferably constitute from 20% to 80% of the composition.

All proportions herein and in the accompanying claims are by weight, unless otherwise specified.

While any organic polyepoxide may be used, it is preferred to employ diepoxides having a 1,2-epoxy equivalency not in excess of about 2.0. Diglycidyl ethers of a bisphenol are particularly preferred, especially those having a 1,2-epoxy equivalency of 1.5–2.0 and an average molecular weight (determined by calculation) in the range of 350 to 8000, preferably 2000 to 5000.

The term "a bisphenol" is known to describe compounds of the formula:

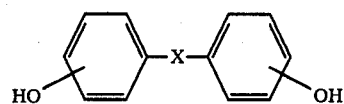

in which X is a straight chain or branched chain divalent aliphatic radical of from 1 to 3 carbon atoms, or $>SO_2$, $>SO$, or —O—.

The preferred bisphenol is bisphenol A in which X is 2,2 propylidene and the two OH groups are in the para position. Other bisphenols are illustrated by 4,4'-thiodiphenol and 4,4'-sulfonyl diphenol.

The invention will be illustrated using a preferred diglycidyl ether of bisphenol A having an average molecular weight of about 4500.

It is desired to point out that this invention reacts a polyepoxide with a stoichiometric deficiency of orthophosphoric acid based on the formation of an ester with only one of the three OH groups in the phosphoric acid (a monoester). Two points should be appreciated with respect to this monoester formation.

First, one of the three OH groups in orthophosphoric acid is much more reactive than the other two. As a result, and under moderate reaction conditions, the reaction goes smoothly to cause monoester formation with all of the phosphoric acid without any significant involvement of the other two OH groups. All that is needed for this purpose is to cook the orthophosphoric acid (typically available as an 85% solution in water) with the epoxy resin in organic solvent solution at about 125° C. The formation of monoester is itself well known.

Second, excess oxirane functionality in a polyepoxide means that some of the oxirane groups will remain unreacted on polyepoxide molecules which carry a monophosphate group. When this oxirane functionality is later reacted with amine, this provides a single molecule including amine reaction product on one portion thereof, and a monophosphate group on another portion thereof. With this in mind, it is especially preferred to employ from 0.2 to 0.5 mol of orthophosphoric acid for each oxirane equivalent in the polyepoxide.

It is not necessary that all of the stoichiometric deficiency of acid be orthophosphoric acid so long as at least 0.1 mol of orthophosphoric acid is used for each oxirane equivalent in the polyepoxide. Carboxylic acids, such as acetic acid or dimethylol propionic acid, can be used in place of a portion of the orthophosphoric acid. At least 10%, preferably 30% to 80%, of the initial oxirane groups should be preserved for subsequent reaction with amine. As more of the epoxy functionality is reacted with acid, the final aqueous dispersion becomes more viscous. This is detrimental because, as viscosity increases, the solids content must be reduced to enable coating application.

The volatile amines which are used herein for salt formation are well known for this purpose. Dimethyl ethanol amine is preferred and will be used herein as illustrative, but many other amines are also useful. Thus, other amines, such as triethyl amine, and mono-, di-, or triethanol amine are all useful. Ammonia is commonly considered a volatile amine for the purpose at hand, but it is less preferred because its use produces lower solids content and requires a greater proportion of water miscible organic solvent.

The amine must be volatile since it is desired to remove as much of the amine as possible from the applied coatings by baking the same to provoke the desired cure.

Smaller proportions of amine than specified herein are normally used. This is because the normal function of the amine is to form salts with unreacted OH groups provided by the monophosphate, and thus provide water dispersibility. Much less than the proportion of amine needed herein is thus normally used and provides an initially satisfactory aqueous dispersion. Unfortunately, these dispersions are not satisfactorily stable for acceptance in commerce, and the art has not been able to correct this instability.

The need for water miscible organic solvents has previously been discussed. It is here pointed out that the final water dispersion will contain both organic solvent and water in a weight ratio of 5:95 to 50:50, preferably from 20:80 to 35:65.

Water dispersible aminoplast and phenoplast resins are well known as curing agents and any of these can be used herein as shown in the Examples. Aminoplast resins are preferred, such as hexamethylol melamine. Useful phenoplast resins are illustrated by a phenol-formaldehyde A-stage resol.

The water dispersible polyhydric alcohol may be any organic compound having a molecular weight of at least 300 and which contains a plurality of alcoholic hydroxy groups. These polyhydric alcohols form a known class of compounds which are illustrated particularly by polyethers formed by adducting ethylene oxide, 1,2-propylene oxide or 1,2-butylene oxide, with a polyhydric alcohol, such as trimethylol propane or ethylene glycol. The base on which the oxides are adducted may even be aromatic, such as the water dispersible polyol made by adducting 6 mols of ethylene oxide onto 1 mol of bisphenol A. Polyesters can also provide useful polyhydric alcohols when they are dispersible in water. Water dispersible polyesters are illustrated by the adduct of ethylene glycol with epsilon caprolactone having a molecular weight of 500. Carboxyl groups may be present in the polyester and provide the desired water dispersibility by salt formation with a volatile amine. A polyester of this character can be provided by polyesterifying one mol of trimethylol propane with one mol of succinic acid, and then adducting with enough succinic anhydride to produce carboxyl groups providing an acid voiue of 50. Except for carboxyl groups in the polyhydric alcohol, no other reactive group should be present. Solution copolymers can also provide the polyhydric alcohol, such as a solution copolymer of 10% 2-hydroxy ethyl acrylate with 5% methacrylic acid, balance equal amounts of styrene and ethyl acrylate.

The polyhydric alcohols will be illustrated using a triol adduct of trimethylol propane with 1,2-propylene oxide of average molecular weight 400. A commercial product of this type is the Wyandotte product Pluracol TP-440.

EXAMPLE 1

914 parts of a diglycidyl ether of bisphenol A having an average molecular weight of about 4500 and a 1,2-epoxy equivalency of about 2.0 (the Shell Chemical Company product Epon 1007 may be used) are charged to a flask equipped with an addition funnel, thermometer and a reflux condenser. 440 parts of 2-butoxy ethanol are also charged to the flask and heat is applied to heat the charge to 125° C. which is maintained until the polyepoxide is dissolved in the solvent.

24 parts of 85% orthophosphoric acid (in water) are premixed with 100 parts of 2-butoxy ethanol and the premixture is added from the addition funnel to the reactor over a 30 minute period with rapid agitation while holding the temperature at 125° C. This temperature is then maintained for 2 hours, and the contents of the flask (a monoester) are allowed to cool to 80° C.

44 parts of dimethyl ethanol amine are then added to the flask at 80° C. over a period of 15 minutes and the 80° C. temperature is maintained for a further 30 minutes to insure complete reaction. 1900 parts of deionized water are then added dropwise with high speed agitation to provide a stable aqueous dispersion having a nonvolatile solids content of 28.6%, a viscosity of U-V on the Gardner-Holdt scale and which possesses a fine particle size in the moderate viscosity noted.

EXAMPLE 2

Example 1 is repeated using only 11 parts of dimethyl ethanol amine in place of the 44 parts thereof used in Example 1. As a result, Example 1 used 914 parts of polyepoxide to supply 0.406 equivalents of oxirane and 24 parts of 85% phosphoric acid to provide 0.208 mol of phosphoric acid. In this way the monoester formed by reaction contains (by calculation) 0.198 equivalents of residual oxirane. 44 parts of dimethyl ethanol amine supplies 0.48 mol of amine so that we use slightly more than 2 mols of amine per equivalent of residual oxirane functionality. In contrast, this repeat of Example 1 using one fourth as much amine employs only about 0.5 mol of amine per equivalent of residual oxirane, but it is ample to provide a good aqueous dispersion.

The addition of hexamethoxy methyl melamine to the aqueous dispersions of Examples 1 and 2 to provide a 50/50 solids content mixture of the two resins yields a stable dispersion when the Example 1 product is employed. When the Example 2 product is used, the performance changes with time, and the dispersion containing the melamine resin gradually settles as a precipitate.

EXAMPLE 3

Hexamethoxy methyl melamine is added to the aqueous dispersion of Example 1 in an amount to provide a 35/65 solids content mixture of melamine resin to polymer solids in Example 1. The resulting dispersion was drawn down on aluminum and steel panels using a #12 wire wound rod. The applied coating was baked for 60 seconds in a 400° F. oven to provide cured coatings having a thickness of 0.3 mil and which resisted 100 double rubs with a methyl ethyl ketone-saturated cloth. The coatings had a pencil hardness of F-H and exhibited excellent flexibility while passing 30 inch pounds of reverse impact.

EXAMPLE 4

The aqueous dispersion of Example 3 has added thereto 20 parts of a propylene oxide adduct of trimethylol propane having an average molecular weight of about 400 to provide a stable dispersion having a solids content ratio of 20/35/65 (polyhydric alcohol/melamine resin/polymer of Example 1). Blending is by simple stirring. The resulting dispersion was applied as in Example 3 and baked in the same way to give substantially the same results.

EXAMPLE 5

Examples 1, 3 and 4 are repeated using 7.5 parts of acetic acid (0.125 mol) in combination with 12 parts (instead of 24 parts) of orthophosphoric acid. The viscosities of the aqueous dispersions were higher than before, but everything else was substantially the same. The product of this example is therefore satisfactory, though less preferred.

EXAMPLE 6

Example 1 is repeated using 12 parts of 85% orthophosphoric acid instead of 24 parts. The product was acceptable, but the dispersion was of large particle size, making it less preferred.

EXAMPLE 7

Example 1 is repeated using n-butanol in place of 2-butoxy ethanol. When water was added at the end of the example, difficulty was experienced in converting the solvent solution into a water dispersion, thus pointing up the need for ether alcohol in the solvent medium. Ether alcohol can be added to this product to enhance water dispersibility.

What is claimed is:

1. A water dispersible epoxy-phosphate ester polymer, oxirane-function-free, salt reaction product of (1) a monoester reaction product containing residual epoxy functionality, of (a) a resinous polyepoxide having at least about 1.4 oxirane groups per molecule and (b) less than 0.9 mol of orthophosphoric acid for each oxirane equivalent in the polyepoxide, with (2) at least 1 mol of a volatile amine per equivalent of oxirane functionality in said monoester.

2. An epoxy-phosphate ester polymer salt as recited in claim 1 in which from 0.1 to 0.7 mol of orthophosphoric acid is used for each oxirane equivalent in said polyepoxide, and at least 2 mols of amine are used per mol of available oxirane functionality in said monoester.

3. An epoxy-phosphate ester polymer salt as recited in claim 2 in which said polyepoxide is a diglycidyl ether of a bisphenol having an average molecular weight in the range of 350 to 8000.

4. An epoxy-phosphate ester polymer salt as recited in any one of claims 1-3 in which said salt is present in solution in water miscible organic solvent medium comprising at least about 10% of an ether alcohol.

5. An epoxy-phosphate ester polymer salt as recited in claim 4 in which more than 75% of said solvent medium is 2-butoxy ethanol.

6. A stable aqueous dispersion of the polymer salt solution recited in claim 4.

7. A stable aqueous dispersion as recited in claim 6 in which said organic solvent is present with respect to water in a weight ratio of 5:95 to 50:50.

8. A stable aqueous dispersion as recited in claim 7 in which said ratio is from 20:80 to 35:65.

9. A stable aqueous dispersion as recited in claim 7 in which 5% to 50% of aminoplast or phenoplast resin is included in said dispersion based on total resin solids.

10. A stable aqueous dispersion as recited in claim 9 in which from 5% to 40% of a water dispersible polyhydric alcohol having a molecular weight of at least about 300 is included in said dispersion based on total resin solids.

11. A stable aqueous dispersion as recited in claim 9 in which from 0.2-0.5 mol of orthophosphoric acid is used for each oxirane equivalent in said polyepoxide and from 30% to 80% of the initial oxirane content is retained in said monoester reaction product.

12. A stable aqueous dispersion comprising an epoxy-phosphate ester polymer salt provided by reacting a diglycidyl ether of a bisphenol having an average molecular weight in the range of 2000 to 5000 and a 1,2-epoxy equivalency of from 1.5 to 2.0 with from 0.2 to 0.5 mol of orthophosphoric acid for each oxirane equivalent in the polyepoxide to thereby form a monoester reaction product containing from 30% to 80% of its initial oxirane content as residual epoxy functionality, and then reacting the monoester reaction product with at least 2 mols of a volatile amine per equivalent of oxirane functionality in said monoester to provide a water dispersible product lacking oxirane functionality, and then dispersing said water dispersible product in water together with from 5% to 50%, based on total resin solids, of aminoplast or phenoplast resin, said dispersion being effected with the aid of water miscible organic solvent comprising at least about 10% of an ether alcohol to provide organic solvent in a weight ratio with respect to water of 5:95 to 50:50.

13. A stable aqueous dispersion as recited in claim 12 in which said amine is dimethyl ethanol amine and more than 75% of the solvent is 2-butoxy ethanol.

14. A method of producing a water dispersible epoxy-phosphate ester polymer salt having improved stability in aqueous dispersion in admixture with aminoplast or phenoplast resin comprising reacting a resinous polyepoxide having at least about 1.4 oxirane groups per molecule with less than 0.9 mol of orthophosphoric acid for each oxirane equivalent in the polyepoxide to thereby form a monoester reaction product containing at least 10% of its initial oxirane functionality, and then reacting the monoester reaction product so-provided with at least 1 mol of a volatile amine per equivalent of oxirane functionality in said monoester to provide a water dispersible product lacking oxirane functionality.

* * * * *